INVENTOR.
James W. Jacobs

Dec. 30, 1958 J. W. JACOBS 2,866,528
CLUTCH FOR REFRIGERATING APPARATUS
Filed March 26, 1954 3 Sheets-Sheet 2
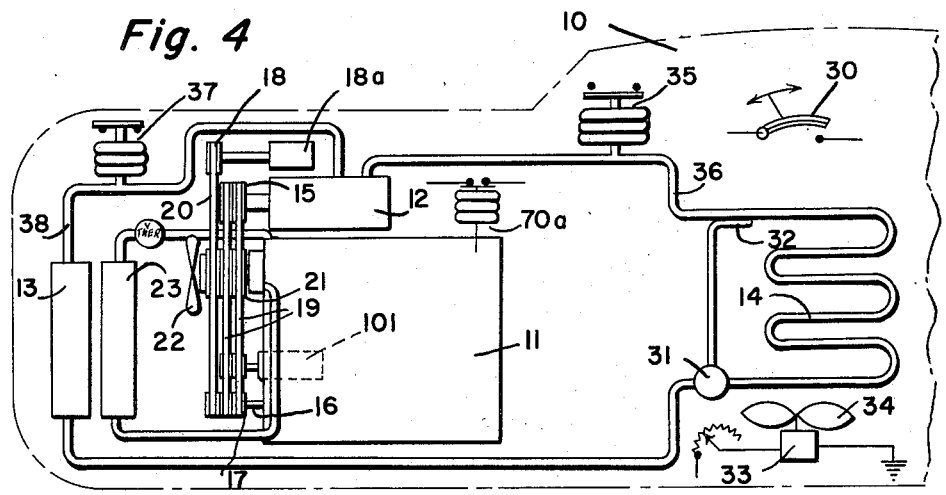
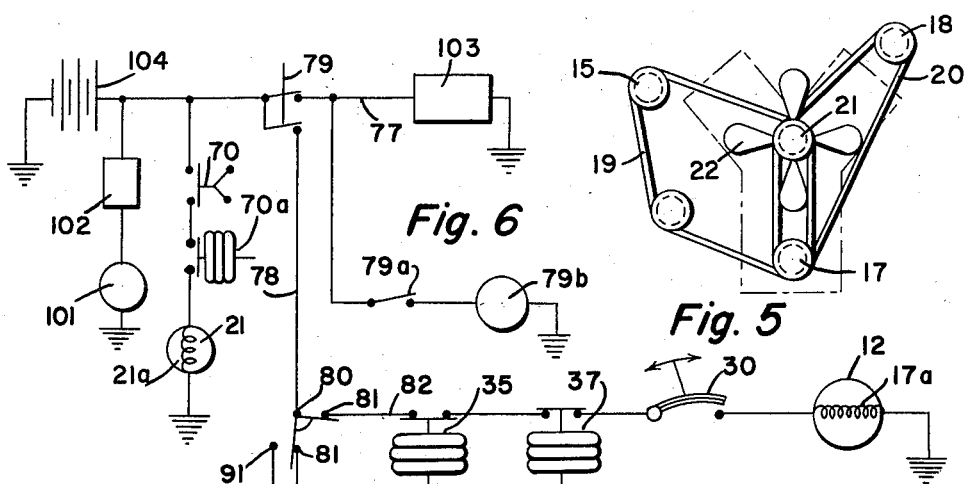
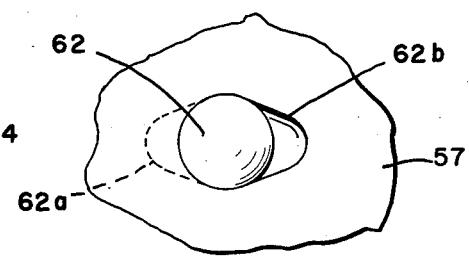
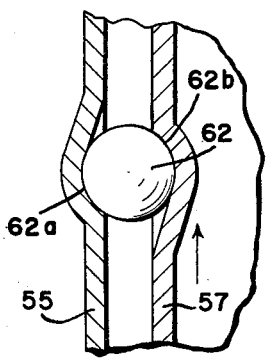
INVENTOR.
James W. Jacobs
BY
Attorney Dec. 30, 1958    J. W. JACOBS    2,866,528
CLUTCH FOR REFRIGERATING APPARATUS
Filed March 26, 1954    3 Sheets-Sheet 3

INVENTOR.
James W. Jacobs
BY
Attorney of Delaware

United States Patent Office 2,866,528
Patented Dec. 30, 1958

2,866,528

CLUTCH FOR REFRIGERATING APPARATUS

James W. Jacobs, Dayton, Ohio, assignor to General Motors Corporation, Detroit, Mich., a corporation Application March 26, 1954, Serial No. 418,931

3 Claims. (Cl. 192—35)

This invention relates to refrigerating apparatus and more particularly to a solenoid controlled clutch.

An object of this invention is to provide an improved solenoid operated clutch between a system utilizing engine power and the engine.

Another object of this invention is to provide a clutch for use between driving and driven members, which clutch is provided with a solenoid operated teaser member.

Further objects and advantages of the present invention will be apparent from the following description, reference being had to the accompanying drawings wherein a preferred form of the invention is clearly shown.

In the drawings:

Figure 2 is a cross-section taken along line 2—2 of Figures 1 and 1a.

Figure 3 is a view taken along the line 3—3 of Figure 1a.

Figure 4 is a diagrammatic representation of an automobile embodying this invention.

Figure 5 is a diagrammatic representation of the front belt drives of the engine in Figure 4.

Figure 6 is a wiring diagram for the system shown in Figure 4.

Figures 1, 1A:
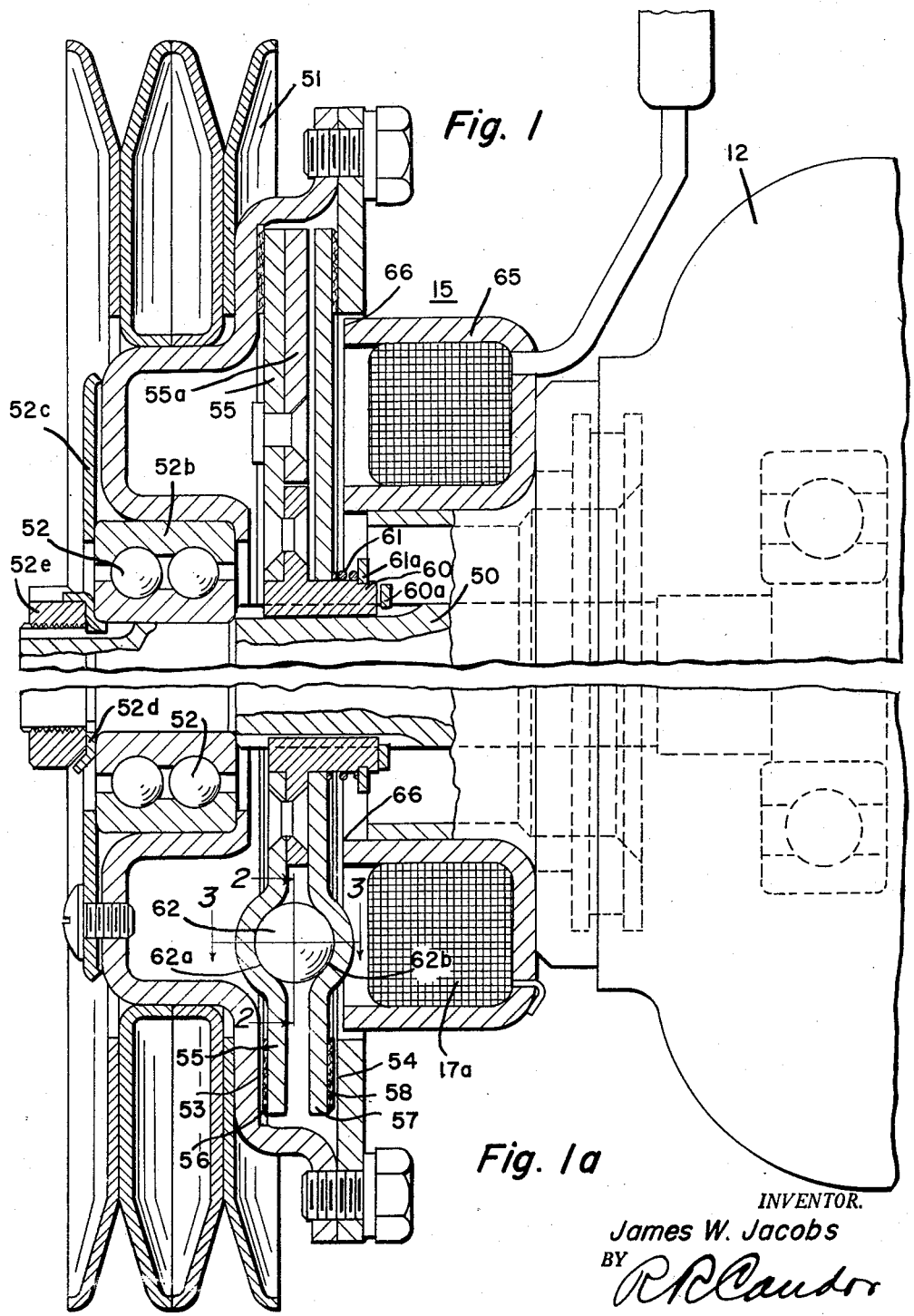
Figure 1 is a longitudinal cross-section of the upper half of a clutch embodying features of my invention and showing the parts in engagement.
Figure 1a is a cross-section of the lower half of the clutch shown in Figure 1 with the parts disengaged.

An automobile 10 is provided with an engine 11 for driving the automobile, in the usual manner.

An air conditioning system for the automobile includes a compressor 12, condenser 13 and evaporator 14 in usual refrigerant flow relationship and mounted on the automobile. A clutch 15 is placed between the engine 11 and the compressor 12, and this clutch is engaged and disengaged by engine power under the control of a solenoid 17a, as more fully hereinafter described.

The engine 11 may be provided with a crankshaft 16 carrying a three-belt pulley 17. Pulley 17 is connected by belts 19 with the clutch pulley 15, and to the fan clutch pulley 21, somewhat of the same construction as clutch pulley 15, but preferably of the type disclosed in my simultaneously filed application for Refrigerating Apparatus, Serial No. 418,867, and which drives the fan 22 for circulating air past the engine cooling radiator 23 and the refrigerant condenser 13. The pulley 17 is connected by belt 20 with the pulley 18 of power steering pump 18a.

The refrigerant air conditioning system may include a thermostat 30 responsive to air temperatures within the passenger compartment. An expansion valve 31 controls the flow of refrigerant through the evaporator 14 and may be of the thermostatic type having a bulb 32 responsive to refrigerant temperatures leaving the evaporator. A motor 33 and fan 34 circulate air over the evaporator 14. A low pressure switch 35 stops the compressor 12 when refrigerant pressures in the return line 36 fall below a permissible limit and maintains the evaporator 14 above freezing temperature. A high pressure control switch 37 stops the compressor 12 when the refrigerant pressures in the high pressure line 38 rise above a permissible limit. The elements so far described are controlled by the wiring system shown in Figure 6, as will be more fully explained.

The clutch 15 is of the character disclosed in Figures 1, 1a, 2, 3 or 7 and 7a. Referring to Figures 1, 1a, 2 and 3, the clutch 15 drives the compressor 12 through the medium of driven shaft 50 which is connected to the moving mechanism of the compressor 12. The engine 11, belts 19 and pulley 51 are the driving means or members for the clutch. The pulley or driving member 51 is mounted rotationally free and axially fixed on the shaft 50 by means of the ball bearing construction 52, which includes inner bearing 52a mounted on shaft 50 and outer bearing 52b held in pulley 51 by plate 52c bolted on pulley 51. Inner bearing 52a is held on shaft 50 by lock washer 52d and nut 52e, threaded on shaft 50. The pulley 51 is provided with friction drive surfaces 53 and 54 which are axially oppositely disposed with respect to each other. A main driving disk 55 has a friction driven surface 56 engageable with and disengageable from drive surface 53. A teaser disk 57 has a driven friction surface 58 engageable with and disengageable from drive surface 54. These friction drive and driven surfaces are movable into engagement with each other as shown in Figure 1, and are disengageable from each other as shown in Figure 1a.

The driving disk 55 is rotationally fixed and axially freely movable on the driven shaft 50 through the medium of a splined and axially movable hub 60. The rearward travel of hub 60 is limited by split ring 60a. The teaser disk 57 is mounted rotationally free and axially movable about the driven shaft 50. This is accomplished by mounting the disk 57 rotationally free and axially movable on the hub 60. A spring 61 is placed between the disk 57 and split ring 61a to urge the disk 57 to the left, when the solenoid 17a is deenergized, and to permit the disk to move to the right when the solenoid 17a is energized.

If desired, counterweight 55a may be placed on disk 55 to counterbalance any unbalanced weight in the compressor 12 or any other rotating part.

Relative rotation reaction spreader means are placed between the disks 55 and 57 for drivingly locking and unlocking the disks to the driving member or members in response to magnetic axial movement of one of the disks such as the teaser disk 57. The relative rotation reaction spreader means may take the form of a plurality of ball and groove constructions, preferably three in number and equally spaced. These constructions each may include the balls or circular members 62 and teardrop or wedging grooves 62a and 62b. When a relative rotation is produced between the disks 55 and 57, the ball and groove constructions 62 spread the disks apart and firmly engage the friction surfaces 53, 54, 56 and 58 to lock the clutch drivingly between the engine and the compressor, and to allow disengagement when the rightward pull of the disk 57 by the solenoid 17a is discontinued.

The solenoid 17a controls the axial movement of the teaser disk 57 by magnetic attraction of the disk. To this end, the solenoid 17a may be a stationary annulus surrounded by a magnetic cup 65 of cast iron or the like having magnetic terminals 66 adjacent the disk 57. The magnetic flux set up in the cup 65 flows past the terminals 66 through the disk 57 and pulls the disk to the right whenever the solenoid is energized. This rightward movement of the disk 57 causes the driven friction surface 58 to engage the driving surface 54 and produces an initial relative rotation between disks 55 and 57 to lock the engine 11 drivingly to the compressor 12.

The solenoid 21a of the clutch 21 may be energized in response to car speed or engine temperature by the centrifugal governor 70 or the engine temperature responsive switch 70a which stops rotation of the fan 22 at high car speeds or low engine temperatures and causes fan rotation at low car speeds or high engine temperatures.

Figure 7:
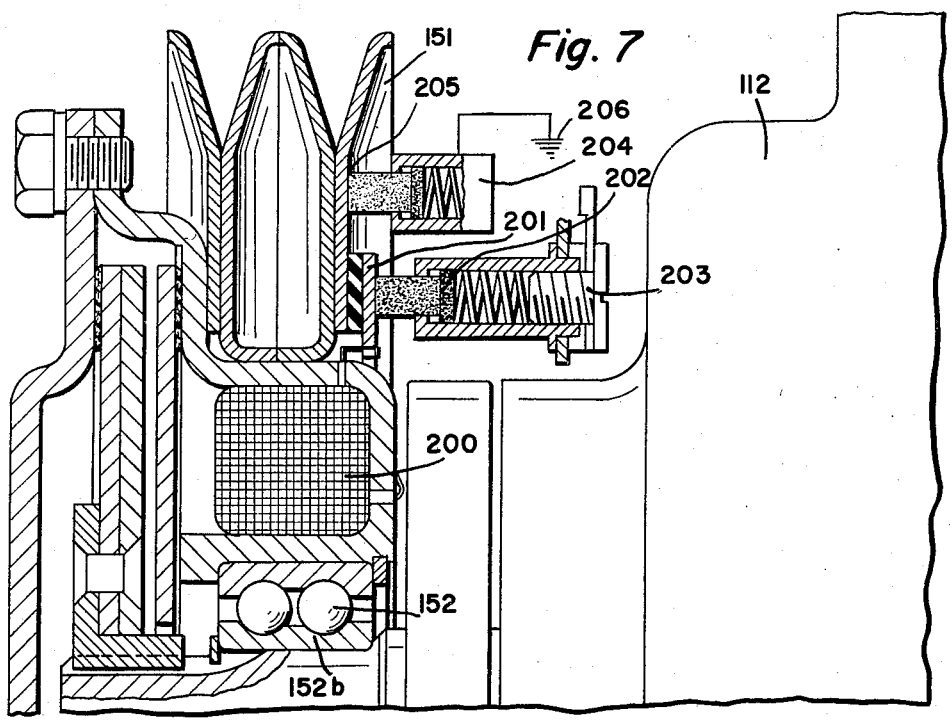
Figures 7 and 7a are views similar to Figures 1 and 1a showing a modified form.
Figure 7A:
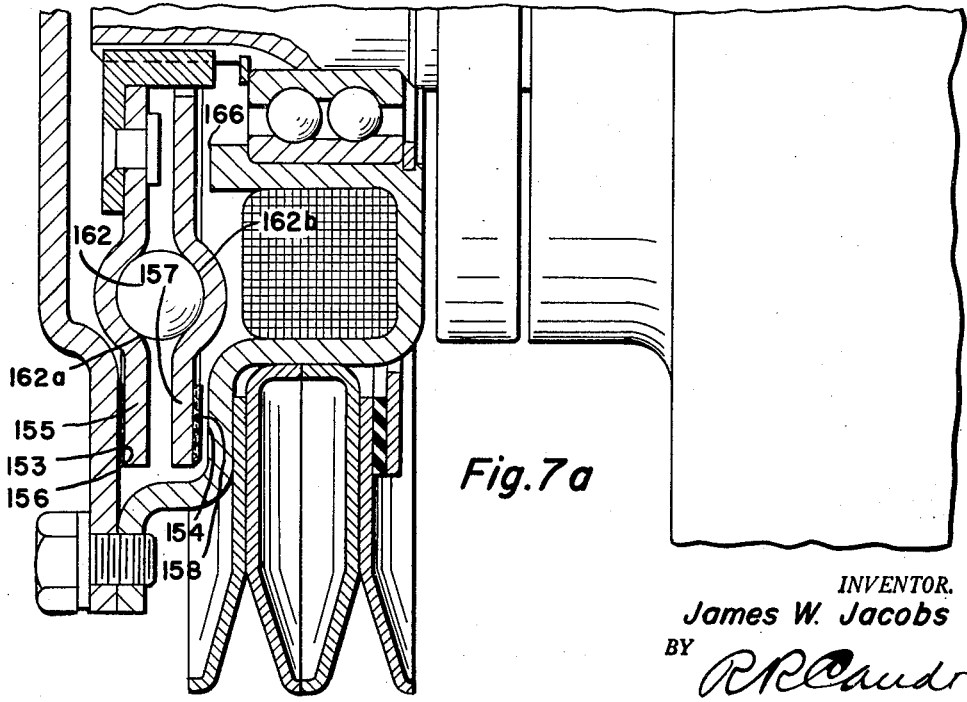

In the modification shown in Figures 7 and 7a, the parts corresponding to those in Figures 1, 1a, 2 and 3 are similarly numbered, with 100 added. However, the solenoid 200 is rotatable within the drive member 151 and receives electric current from the ring 201 which is engaged by the brush 202 which is connected to the stationary electric conductor 203 leading from the battery of the automobile. If desired, a ground brush 204 may engage the ring surface 205, and the brush 204 may be connected to any grounded part 206 of the automobile which leads to the ground connection of the battery.

In the operation of the invention, the engine 11 is started in the usual manner by closing the combined ignition-air conditioning switch 79, which energizes the air conditioning lead 78 and the engine ignition lead 77. The starter switch 79a is then energized automatically or in any usual manner, to operate starter 79b. When the user desires air conditioning, with refrigeration, he moves the special air conditioning switch 80 (Figure 5) to close on the contacts 81. This energizes the air conditioning circuits 82 and 83. The circuit 82 includes the thermostat 30 to adjust its setting to the desired temperature and the pressure switches 35 and 37, which govern the energization of solenoid 17a and compressor 12. When the temperature in the passenger compartment rises, current flows to energize the solenoid 17a of the clutch, to lock the clutch drive and cause compressor operation. When the temperature falls, 30 opens and stops the compressor. The evaporator blowers 34 and its motor 33 are energized by the circuit 83 which passes through the adjustable rheostat 90, which determines the speed of the blower 34 as desired by the user. If the refrigerant suction pressure drops near a corresponding freezing evaporator temperature, switch 35 opens and stops the compressor temporarily. If the head pressure rises beyond a safe limit, switch 37 opens and stops the compressor temporarily.

Should the user desire no air conditioning and no ventilation, the switch 80 is moved to an intermediate position. If he desires ventilation without air conditioning, the switch 80 is moved onto the contact 91, and under these conditions the blower 34 is operated while the refrigeration system remains idle. This provides the desired ventilation.

The centrifugal switch 70 and the engine temperature responsive switch 70a control the clutch 21 through the medium of a solenoid 21a, the clutch construction being somewhat of the same as heretofore described with respect to clutch 15, or as specifically disclosed in my simultaneously filed application, supra.

The engine 11 may be provided with the usual generator 101, current and voltage regulator and cutout relay 102, starter 79b and ignition system 103, all connected to the battery 104 in the usual manner through electrical circuits now well known, and controlled by the combined air conditioning-ignition switch 79 which has added thereto the connections for energizing the air conditioning system and fan control system.

While the form of embodiment of the invention as herein disclosed constitutes a preferred form, it is to be understood that other forms might be adopted as may come within the scope of the claims which follow.

What is claimed is as follows:

1. In combination: a rotatable clutch driving member; a rotatable clutch driven member; a driving disk rotationally fixed on said driven member and axially movable into driving engagement with said driving member; an axially movable teaser disk rotationally free from said driving and driven members and axially movable into rotational engagement with said driving member; relative rotation reaction spreader means directly interposed between said disks for spreading said disks to lock and unlock said driving and driven members responsive to axial movement of said teaser disk, said teaser disk being located at one side of said driving disk and having magnetic properties, a device having a housing and means driven by said driven member, and a solenoid fixed to said housing and located at the side and adjacent to said teaser disk for attracting said teaser disk to operate said spreader means.

2. In combination: a rotatable clutch driving member; a rotatable clutch driven member; a driving disk rotationally fixed on said driven member and axially movable into driving engagement with said driving member; an axially movable teaser disk rotationally free from said driving and driven members and axially movable into rotational engagement with said driving member; relative rotation reaction spreader means directly interposed between said disks for spreading said disks to lock and unlock said driving and driven members responsive to axial movement of said teaser disk, said teaser disk being located at one side of said driving disk and having magnetic properties, said driving member having inwardly facing contact surfaces adjacent the outurned faces of said disks, said driving member having an opening within said contact surfaces adjacent the outturned face of said teaser disk, a device having a relatively stationary housing containing means connected to and driven by said driven member, and a solenoid fixed to said housing and having a portion located within said opening of said driving member at the side of and adjacent the outturned face of said teaser disk for attracting said teaser disk to operate said spreader means.

3. In combination: a rotatable clutch driving member; a rotatable clutch driven member; a driving disk rotationally fixed on said driven member and axially movable into driving engagement with said driving member; an axially movable teaser disk rotationally free from said driving and driven members and axially movable into rotational engagement with said driving member; relative rotation reaction spreader means directly interposed between said disks for spreading said disks to lock and unlock said driving and driven members responsive to axial movement of said teaser disk, said driving member including a housing providing an enclosure on the outturned face of the driving disk and a ring at the side of and adjacent the outturned face of said teaser disk, said disks being located side by side within said housing, said teaser disk having magnetic properties, a device having a housing and means driven by said driving member, and an annular solenoid surrounding said driven member having a portion located within said ring and being fixed to the housing of said device for attracting said teaser disk to operate said spreader means.

References Cited in the file of this patent

UNITED STATES PATENTS

| | | |
|---|---|---|
| 1,746,365 | Schunemann | Feb. 11, 1930 |
| 2,091,270 | Colman | Aug. 31, 1937 |
| 2,130,995 | Henney | Sept. 20, 1938 |
| 2,181,053 | Hamilton | Nov. 21, 1939 |
| 2,207,728 | Goodman | July 16, 1940 |
| 2,214,391 | Weydell | Sept. 10, 1940 |
| 2,344,864 | Griswold | Mar. 21, 1944 |
| 2,401,426 | Killoran | June 4, 1946 |
| 2,449,888 | Edwards | Sept. 21, 1948 |
| 2,614,396 | Ratermann | Oct. 21, 1952 |
| 2,649,941 | Doebeli | Aug. 25, 1953 |
| 2,658,593 | Doebeli | Nov. 10, 1953 |